US008683260B1

(12) United States Patent
Zhang et al.

(10) Patent No.: US 8,683,260 B1
(45) Date of Patent: Mar. 25, 2014

(54) MANAGING OWNERSHIP OF LOGICAL VOLUMES

(75) Inventors: Qi Zhang, Northborough, MA (US);
Qing Liu, North Grafton, MA (US);
Peter Tolvanen, Foxborough, MA (US);
Brahmadev Anand, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 534 days.

(21) Appl. No.: 12/980,932

(22) Filed: Dec. 29, 2010

(51) Int. Cl.
*G06F 11/00* (2006.01)
(52) U.S. Cl.
USPC .............. 714/13; 714/6.1; 714/6.3; 714/42
(58) Field of Classification Search
USPC ............. 714/6.1, 6.22, 6.3, 13, 42; 711/114
See application file for complete search history.

(56) References Cited

U.S. PATENT DOCUMENTS

| 7,523,139 | B1* | 4/2009 | Kemkar et al. | 707/999.2 |
| 7,779,201 | B1* | 8/2010 | Agarwal et al. | 711/114 |
| 7,930,587 | B1* | 4/2011 | Coatney et al. | 714/6.32 |
| 2008/0021992 | A1* | 1/2008 | Sarma et al. | 709/223 |
| 2013/0067163 | A1* | 3/2013 | Velayudhan et al. | 711/114 |

\* cited by examiner

*Primary Examiner* — Joseph D Manoskey
(74) *Attorney, Agent, or Firm* — Krishnendu Gupta; Deepika Bhayana

(57) ABSTRACT

A method is used in managing ownership of logical volumes. A path to a logical volume is determined, where upper-layer software selects the path to the logical volume. Based on the selection of the path, ownership of the logical volume is assigned. Lower-layer software assigns ownership of the logical volume based on information received from the upper-layer software.

20 Claims, 9 Drawing Sheets

MANAGING OWNERSHIP OF LOGICAL VOLUMES

BACKGROUND

1. Technical Field

This application relates to managing ownership of logical volumes.

2. Description of Related Art

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable.

A typical data storage system stores and retrieves data for one or more external host devices. Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Further, disk arrays included in a data storage system may use a variety of storage devices with various characteristics for providing storage to a user. Each disk array may logically operate as a unified storage device. A data storage system may also include one or more storage array processors (SPs), for handling requests for storage allocation and input/output (I/O) requests. A storage processor (SP) in a disk array is the controller for and primary interface to the disk array. Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a unified disk array to appear as a collection of separate file systems, network drives, and/or volumes.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

As described above, applications access and store data incrementally by use of logical storage array partitions, known as logical units (LUNs). LUNs are made up of collections of storage blocks of a RAID array and are exported from the RAID array for use at the application level. LUNs are managed for use at the application level by paired storage processors (SPs). Ownership of a LUN is determined when the LUN is mounted by the application, with one of the paired SPs designated as the owner SP and the other SP acting as a backup processing device for the owner SP.

Ownership of a LUN may change under a variety of circumstances. For example, ownership of a LUN may migrate from one SP to another SP for host load balancing reasons, for host failover events, for SP failures, and for manual trespass operations initiated by a user at an application level. The term "trespass," as used herein, refers to a change of ownership of a LUN from one SP to another SP. Host failover is a process by which a storage processor is eliminated as a single point of failure by providing hosts the ability to move the ownership of a LUN from one storage processor to another storage processor.

SUMMARY OF THE INVENTION

A method is used in managing ownership of logical volumes. A path to a logical volume is determined, where upper-layer software selects the path to the logical volume. Based on the selection of the path, ownership of the logical volume is assigned. Lower-layer software assigns ownership of the logical volume based on information received from the upper-layer software.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
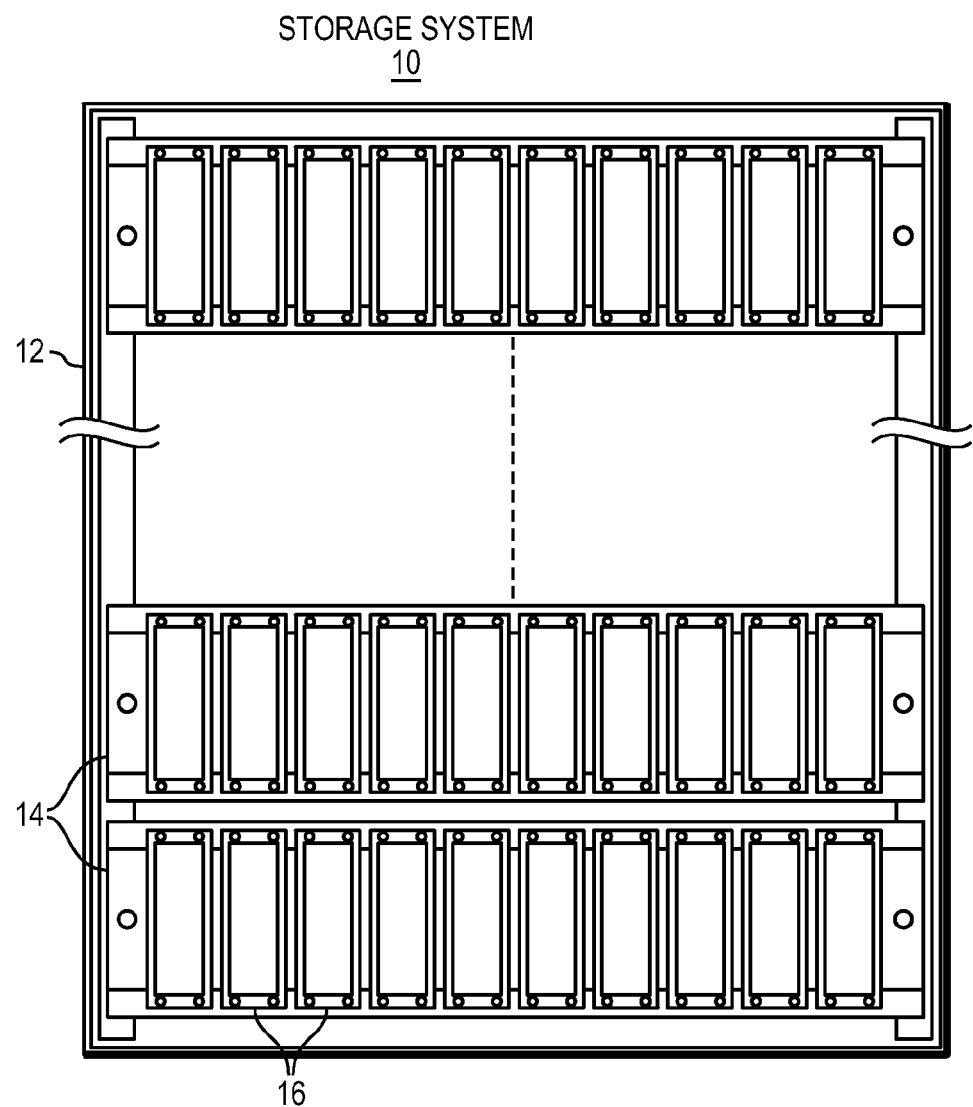
FIG. 1 is a representation of a rack mount system including several storage enclosures and is an example of an embodiment of a computer system that may utilize the techniques described herein.

Described below is a technique for use in managing ownership of logical volumes, which technique may be used to provide, among other things, determining a path to a logical volume by upper-layer software and assigning ownership of the logical volume by lower-layer software based on the determination of the path to the logical volume by the upper-layer software.

Conventionally, in a data storage system, a set of one or more LUNs associated with a set of disk drives in a RAID group are assigned to a storage processor. The storage processor to which the set of one or more LUNs are assigned is indicated as the default owner for the set of one or more LUNs. As a result, the storage processor is responsible for all communications directed to the set of one more LUNs. Further, each storage processor in the data storage system includes lower-layer software and upper-layer software. Conventionally in such a system, when a storage processor loses access to a set of disk drives due to a problem, the lower-layer software of the storage processor marks the disk drives that it cannot access as bad and determines an alternate path to the set of disk drives with the help of the upper layer software of the storage processor. Upon finding an alternate path, in such a conventional system, the storage processor relinquishes ownership of the set of one or more LUNs associated with the set of disk drives in the RAID group. Thus, conventionally in such a case, the upper-layer software of the storage processor assigns ownership of the set of one or more LUNs to an alternate storage processor having the alternate path and I/Os from a host system are redirected to that alternate storage processor. Conventionally in such a case, when the problem is fixed at a later time and access to the disk drives is restored, the storage processor needs to rebuild the disks drives. In a RAID group, when a physical disk drive fails ("failed drive"), the host attached to the data storage system keeps writing data to the physical disk drive. When the failed drive is replaced, either automatically (e.g., by a hot spare, which is an idle disk drive that can be integrated into the RAID group electronically) or manually (by removing the failed drive and inserting a new drive), a disk rebuild is needed wherein the failed drive's data is rebuilt onto the replacement drive based on data storage redundancy within the RAID group. After the disk drives are rebuilt, in such a conventional case, the lower layer software of the storage processor reassigns the set of one or more LUNs associated with the set of disk drives within the RAID group to a storage processor indicated as a default owner. However, in such a conventional case, the set of one or more LUNs may be owned by an alternate storage processor at the time disk drives are rebuilt. As a result, in such a conventional system, a problem of misalignment of ownership is created by assigning ownership of the set of one or more LUNs to a storage processor that may no longer is the owner of the set of one or more LUNs. Conventionally in such a case, upper-layer software of a storage processor may change the ownership of a set of one or more LUNs to an alternate storage processor. However, in such a conventional case, lower-layer software of a storage processor only maintains information regarding a default owner that is determined initially when the set of one or more LUNs are first created and assigned to a storage processor. As a result, in such a conventional system, the lower-layer software always assigns the ownership of the set of one or more LUNs to a storage processor indicated as a default owner irrespective of whether the storage processor indicated as the default owner has the ownership of the set of one or more LUNs at that time. Therefore, in such a conventional system, when ownership of a set of one or more LUNs is changed by upper-layer software, reassignment of ownership of the set of one or more LUNs by lower-layer software may create a misalignment. Thus, in such a conventional system, any command that requires lower-layer software to own a set of one or more LUNs fails, if the lower-layer software assigns the ownership of the set of one or more LUNs incorrectly, in turn creating misalignment with the upper-layer software of the storage processor.

By contrast, in at least some implementations in accordance with the technique as described herein, assigning ownership of a logical volume (LUN) by lower-layer software based on selection of a path to the logical volume by upper-layer software allows the upper-layer software to be in alignment with the lower-layer software and helps in avoiding incorrect assignment of the ownership of the logical volume. In at least one data storage system implementation as described below, assigning ownership of the logical volume by the lower-layer software based on the information received from the upper-layer software in order to continue servicing user I/Os provides uninterrupted access to data and improves the system's performance dramatically. In at least some implementations in accordance with the technique as described herein, the lower-layer software assigns the LUN to a preferred storage processor determined by the upper-layer software and ensures that the ownership of logical volume is aligned correctly between the upper-layer software and the lower-layer software.

In at least some implementations in accordance with the technique as described herein, use of managing ownership of logical volumes can provide one or more of the following advantages: improving data storage system performance by aligning ownership of logical volumes in a data storage system correctly, increasing system availability by assigning ownership of logical volumes correctly and eliminating or reducing degraded I/O performance during read or write operations by assigning ownership of logical volumes correctly after access to logical volumes is restored.

Figure 2:
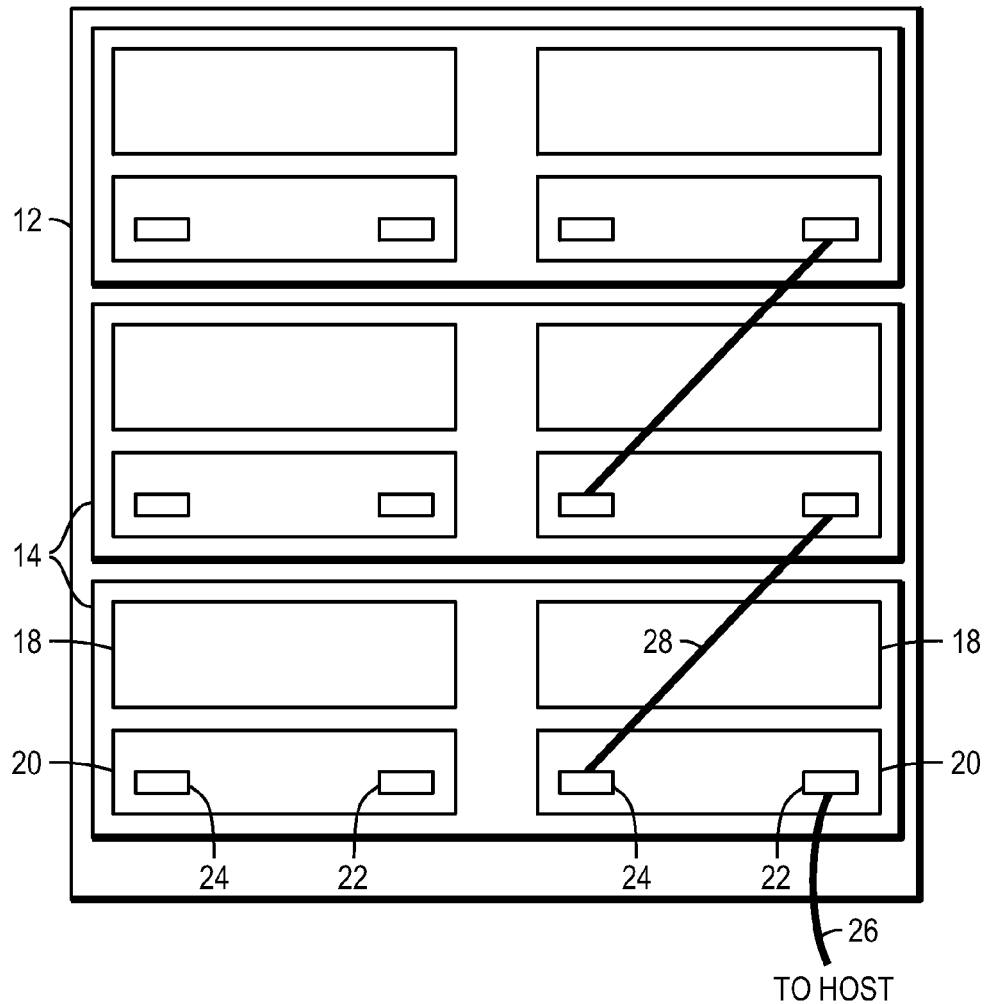
FIG. 2 is a rear view of the rack mount system and storage enclosures of FIG. 1.

Referring to FIG. 1, shown is an example of an embodiment of a data storage system 10 that may be used in connection with performing the technique or techniques described herein. A rack mount cabinet 12 includes several storage enclosures 14. Each storage enclosure 14 includes several disk drives 16. The disk drives and the enclosures are preferably interconnected via a serial bus loop or ring architecture, e.g., Fibre Channel Arbitrated Loop (FC-AL). In FIG. 2 there is shown a rear view of the rack mount cabinet 12 and the storage enclosure 14. Each storage enclosure includes two power supplies 18, and two LCCs 20. The power supplies 18 and link control cards 20 are coupled to the disk drives 16 via a midplane within the chassis (not shown in FIG. 2). The link control card 20 serves to interconnect the disks and enclosures on the communication loop FC-AL.

Each link control card 20 includes a primary port 22 and an expansion port 24. These ports are used to link the storage enclosures together on a single communication loop FC-AL.

A cable 26 may come from a host or from another storage system, and plugs into the primary port 22. The communication loop FC-AL extends from the primary port 22, is coupled to the disk drives 16, and continues out the expansion port 24. A cable 28 couples the expansion port 24 of a first storage enclosure 14 to the primary port 22 of a second storage enclosure 14. All the storage enclosures 14 are interconnected in this manner in a daisy chain to form the communication loop FC-AL. Thus, all the disk drives 16 are interconnected on the same communication loop FC-AL. Each link control card 20 is capable of controlling all the disks 16 in a given enclosure.

Figure 3:
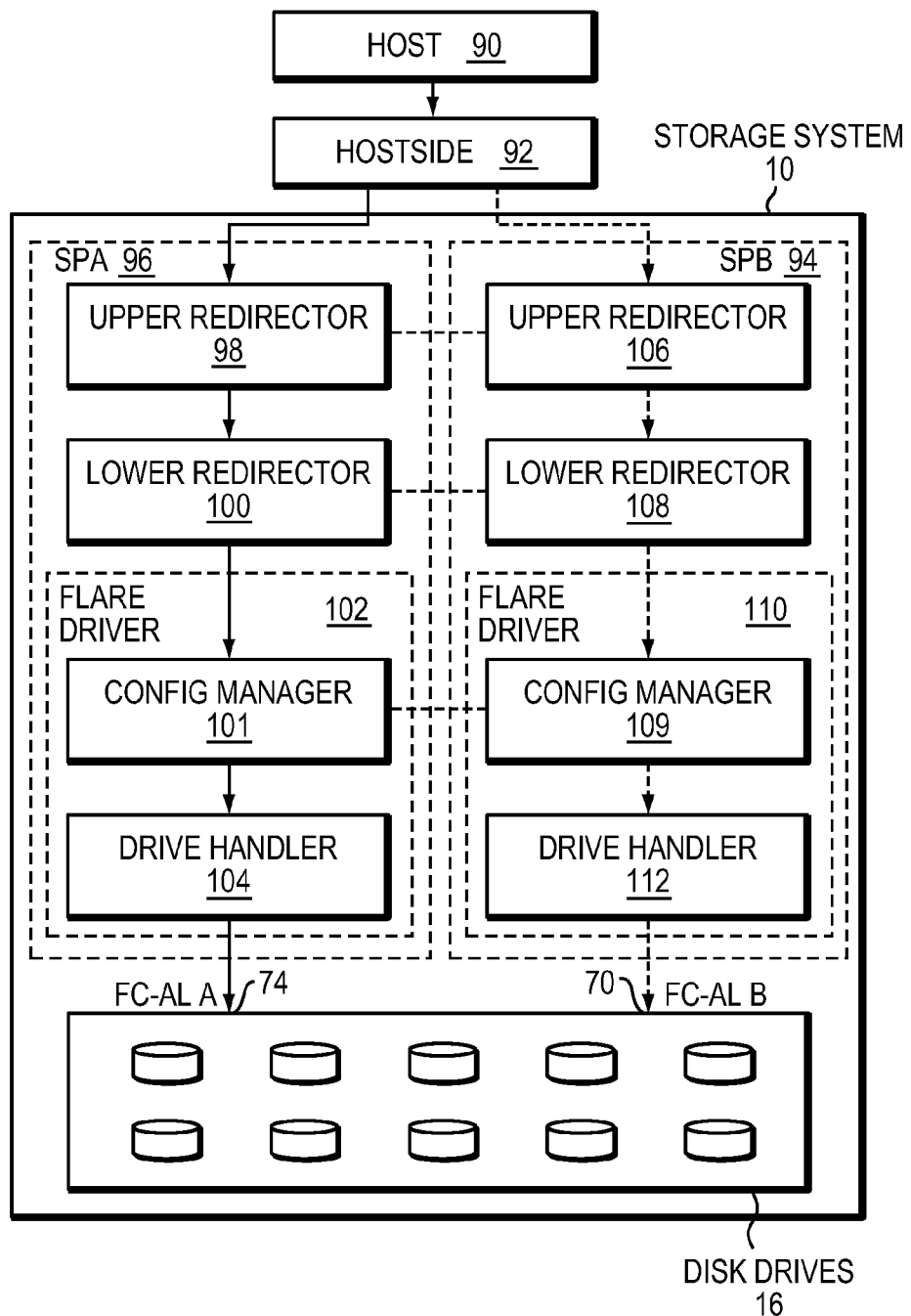
FIG. 3 is a diagram illustrating in more detail components that may be used in connection with techniques herein.

Referring to FIG. 3, shown is more detailed representation of components that may be included in an embodiment using the techniques herein. In a data storage system such as data storage system 10, a storage processor provides communications between host system 90 and disk drives 16. Data storage system 10 includes at least two storage processors 96, 94. Storage Processor (SPA) 96 accesses the disk drives 16 using Fibre Channel communication loop FC-AL 74 and storage processor (SPB) 94 accesses the disk drives 16 using Fibre Channel communication loop FC-AL 70.

Host system 90 may not address the disk drives of the storage systems directly, but rather access to data may be provided to one or more host systems from what the host systems view as a plurality of logical devices or logical volumes ("LVs" or "LUNs"). Host system 90 sends a request to hostside logic ("hostside") (e.g., hostside 92) to access data stored on logical devices. The hostside sends appropriate status back to the host system in case access to data fails. The LVs may or may not correspond to the physical disk drives. For example, one or more LVs may reside on a single physical disk drive. Data in a single data storage system may be accessed by multiple hosts allowing the hosts to share the data residing therein. Regarding terminology related to a storage system, the host or host network is sometimes referred to as the front end and from disk adapters toward the disks is sometimes referred to as the back end. A disk adapter is a component that allows disk drives to communicate with a storage processor.

In at least some systems, one storage processor ("primary SP") is primarily responsible for all communications with a set of LUNs associated with disk drives in a data storage system, and one or more other SPs may be primarily responsible for all communications with other sets of LUNs associated with disk drives in the data storage system. The primary SP is also known as the owner SP. A back end path failure occurs when a problem in any of components that make up the back end causes a set of disk drives to be inaccessible on a primary SP in a data storage system but accessible on another SP in the data storage system. A back end path failure is generally caused by a faulty fibre channel cable, a link control card or a single disk port failure in a disk with two ports. When a back end path failure occurs for the set of disk drives in communication with the primary SP, the data storage system 10 shuts down the affected disk drives on that primary SP, in turns shutting down a set of one or more LUNs associated with the affected drives. On determining that the other SP can access the set of disk drives, a trespass command is issued to the other SP that transfers the responsibility of communication with the affected disk drives to the other SP, in effect causing the other SP to become the new primary SP for the affected disk drives. Thus, ownership of the set of one or more LUNs is transferred to the new primary SP. For example, host 90 sends an I/O request through hostside 92 to storage processor SPA 96. Based on the I/O request, SPA 96 sends corresponding data requests to disk drives 16 through upper redirector 98, lower redirector 100, configuration manager ("CM") 101 and drive handler 104. Upper redirector 98 and lower redirector 100 enable the data storage system to provide an alternate path to a set of disk drives by redirecting I/Os from one SP to another SP. Drive handler 104 enables the data storage system to interact with disk drives 16. Configuration manager 101 communicates with other storage processors in the data storage system in order to enable the data storage system to determine an alternate path to a set of disk drives. Configuration manager 101 detects a back end path failure where communication loop FC-AL A 74 cannot access LUNs on a set of disk drives in a RAID group. It should be noted that detection of the back end path failure may happen at any of different places within a storage processor. For example, configuration manager 101 may detect a back end failure when SPA 96 accesses data from a set of disk drives 16. Lower redirector 100 then may receive a status report from configuration manager 101 indicating that a LUN is missing disks due to a back end path failure. Lower redirector 100 broadcasts the status report to other storage processors in the data storage system 10, in this case to lower redirector 108 of SPB 94 (also referred as peer SP). The SPB 94 then compares the status report with SPB's own local data. If SPB 94 is in a better state and can access the LUNs associated with the set of disk drives in the RAID group, the data storage system causes SPA 96 to send a trespass command to SPB 94 that pulls ownership of the affected LUNs from SPA 96 to SPB 94. The trespass command changes responsibility of communication with the set of disk drive in RAID group from SPA 96 to SPB 94, in effect, by changing the ownership of one or more LUNs associated with the set of disk drives. When ownership of the LUNs is transferred to SPB 94, I/Os from host 90 are redirected to SPB 94. Storage Processor SPB 94 then services those I/Os by sending the I/O requests to disk drives 16 through upper redirector 106, lower redirector 108, configuration manager 109, drive handler 112 and communication loop FC-AL B 70. Lower redirectors 100 and 108 may also handle rejected read/write I/Os that were rejected because a set of disk drives are inaccessible due to a back end path failure on SPA 96 or SPB 94. In that case, I/Os targeted for the set of disk drives may also be redirected to the peer SP (e.g., I/Os from SPA 96 may be redirected to SPB 94 in case of failure on SPA 96 and I/Os from SPB 94 may be redirected to SPA 96 in case of failure on SPB 94) and those redirected I/Os could also fail due to any number of reasons on the peer SP. In that case, lower redirectors 100 and 108 retries the failed I/Os on their respective local SPs again. In at least some implementations in accordance with the technique as described herein, on SPA 96, upper-layer software may include lower redirector 100 and lower-layer software may include flare driver 102. Flare driver 102 on SPA 96 may include configuration manager 101 and drive handler 104. Similarly, on SPB 94, upper-layer software may include lower redirector 108 and lower-layer software may include flare driver 110. Flare driver 110 on SPB 94 may include configuration manager 109 and drive handler 112.

Figure 4:
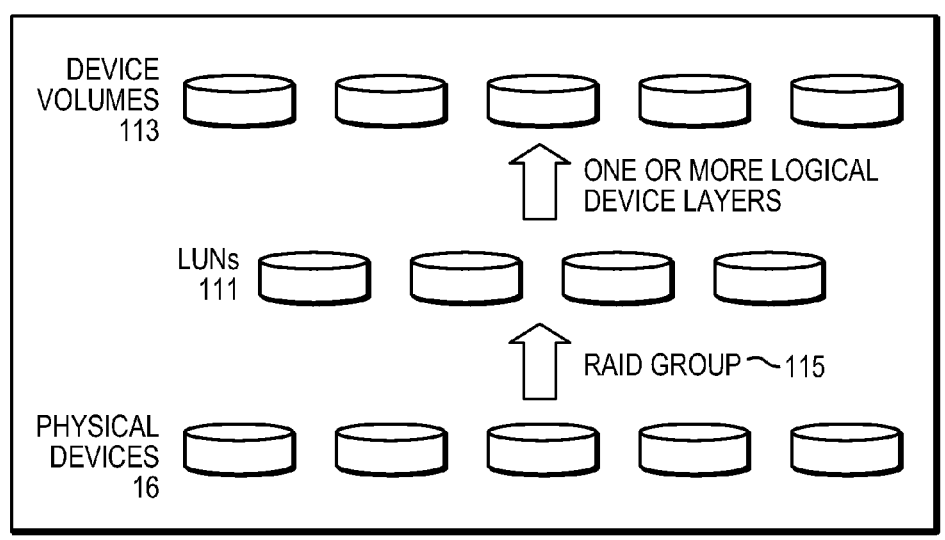
FIG. 4 is an example illustrating storage device layout.

FIG. 4 illustrates one of the many ways data can be stored on the disk drives 16. For example, RAID Group 115 may be formed from physical devices 16. The data storage system 10 best practices of a policy may specify the particular RAID level and configuration for the type of storage extent being formed. The RAID Group 115 may provide a number of data storage LUNs 111. An embodiment may also utilize one or more additional logical device layers on top of the LUNs 111 to form one or more logical device volumes 113. The particular additional logical device layers used, if any, may vary with the data storage system. It should be noted that there may not be a 1-1 correspondence between the LUNs of 111 and the volumes of 113. In a similar manner, device volumes 113 may be formed or configured from physical devices 16. Device volumes 113, LUNs 111 and physical devices 16 may be configured to store one or more blocks of data or one or more files organized as a file system.

Figure 5:
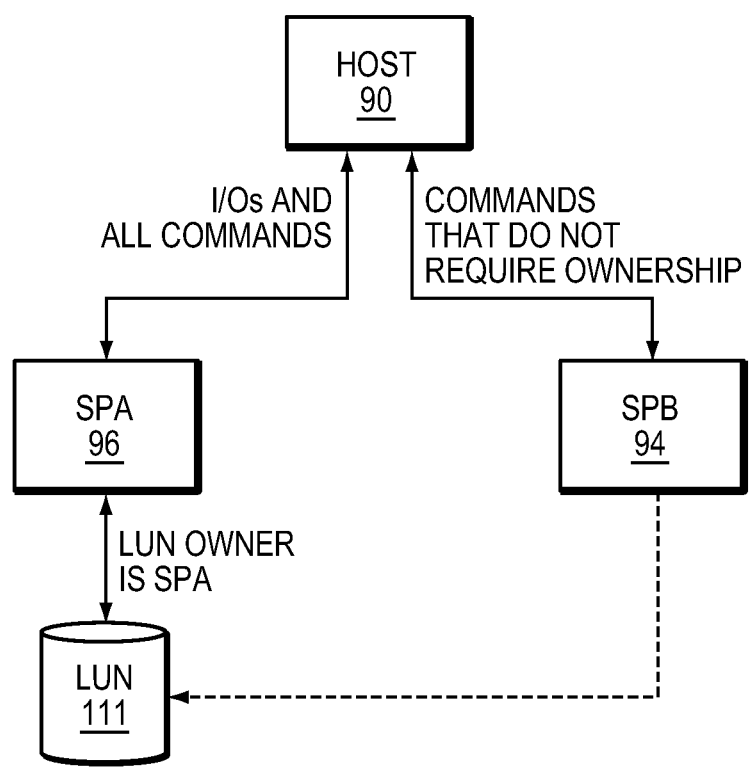
FIGS. 5-6 are diagrams illustrating ownership of a LUN.

Referring to FIG. 5, shown is representation of components illustrating ownership of a LUN that may be included in an embodiment using the techniques herein. With reference also to FIG. 3, a primary storage processor is the owner of a set of LUNs associated with a set of disk drives in data storage system 10. Ownership of a LUN indicates that commands including I/O requests directed to the LUN may only succeed if issued to lower-layer software of a storage processor that owns the LUN. Commands that do not require ownership can succeed when issued to any storage processor in the data storage system irrespective of whether the storage processor owns the LUN. For example, in FIG. 5, SPA 96 is primarily responsible for all communications with LUN 111 and thus is the owner of the LUN 111. If host 90 issues a command requiring ownership including an I/O request to SPB 94 directed to LUN 111, the command will be rejected by SPB 94 and the command will fail. Upper-layer software (e.g. Lower redirector 100, 108) controls ownership of a LUN and informs other software layers regarding any change in the ownership of the LUN. In FIG. 5, SPA 96 is the default owner of the LUN 111 because the LUN 111 has been assigned to SPA 96 at the time the LUN 111 was first created and used by an application of a host. However, a trespass of ownership from SPA 96 to SPB 94 may occur at a later time for any number of reasons. Ownership of a LUN may change based on an explicit assignment request or an internal assignment request triggered within lower-layer software of a storage processor. An internal assignment request may be triggered when upper-layer software sends a command to inquire regarding state of a LUN. Additionally, an internal assignment operation may also be triggered when access to a LUN is restored after the LUN cannot be accessed from any storage processor of a data storage system. In above mentioned cases, when an assignment operation is triggered for a LUN, lower-layer software needs to assign an owner for the LUN.

Figure 6:
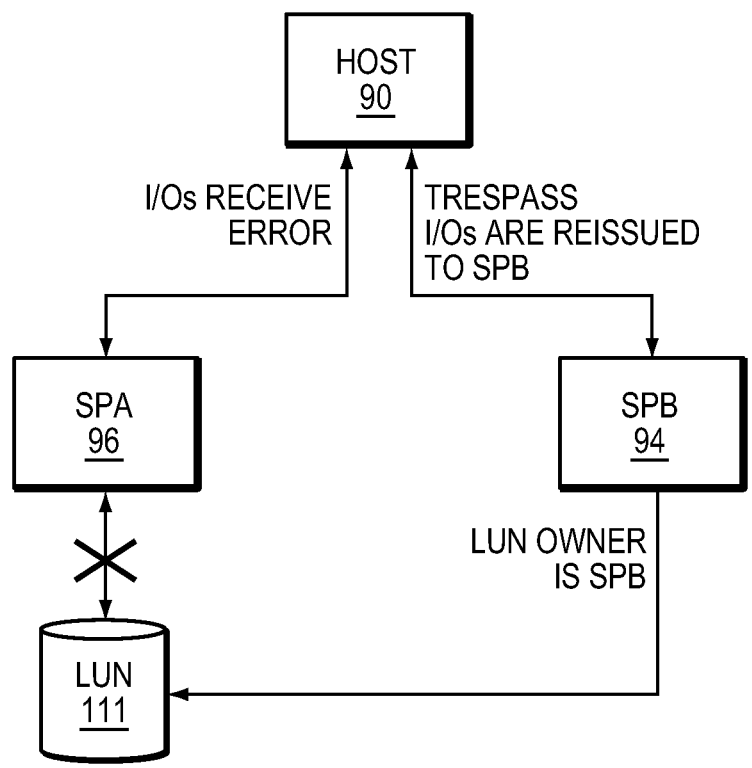

FIG. 6 depicts a solid line between SPB 94 and LUN 111 to represent that ownership of the LUN 111 is changed from SPA 96 to SPB 94. If host 90 receives I/O errors from SPA 96 while accessing the LUN 111, ownership of the LUN 111 is trespassed from SPA 96 to SPB 94. As a result, SPB 94 becomes the new primary owner of the LUN 111 and host 90 redirects all I/O requests to SPB 94.

Figure 7:
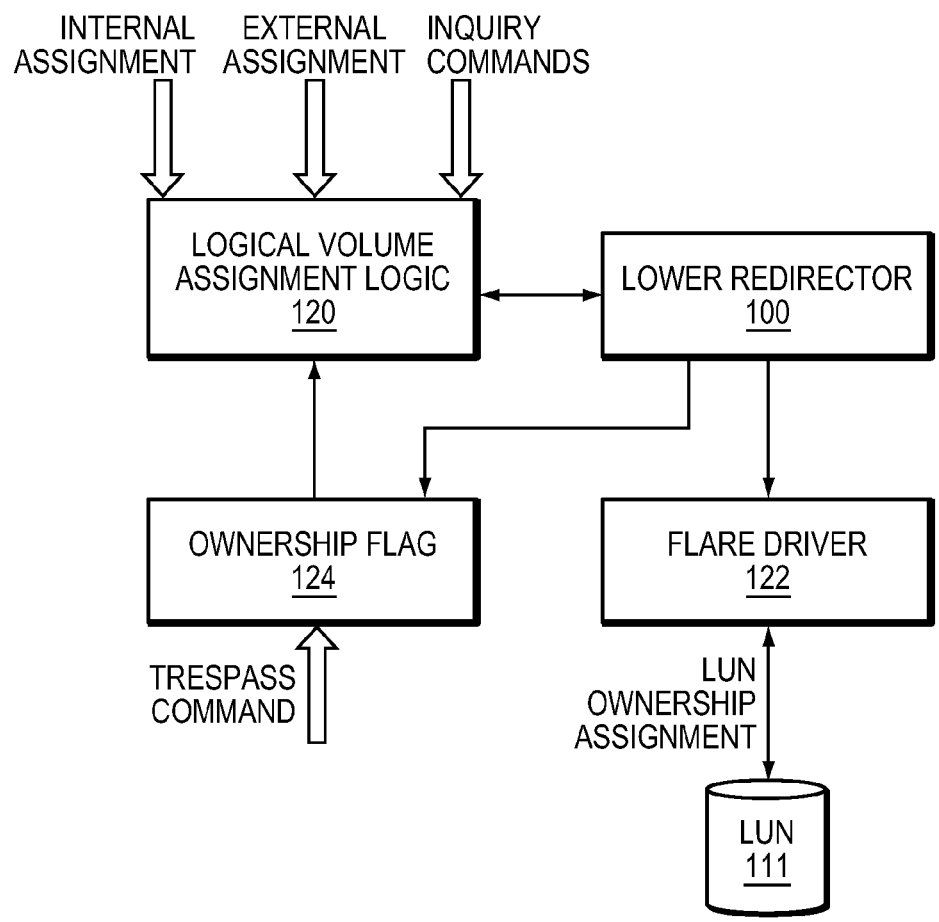
FIGS. 7-8 are diagrams illustrating in more detail components that may be used in connection with techniques herein.

Referring to FIG. 7, shown is detailed representation of components that may be included in an embodiment using the techniques herein. In a data storage system, when ownership of a LUN is changed from a first SP to a second SP, a trespass command is issued to the first SP indicating that the first SP has lost ownership of the LUN. In at least some implementations in accordance with the technique as described herein, an ownership flag 124 indicates which storage processor currently owns a LUN. In some implementation, in accordance with the current technique, the ownership flag 124 is maintained in a flare database. The database maintained by flare driver 122 in data storage system 10 is known as a "flare database". The flare database stores information regarding various data structures used by flare driver 122. The flare database is saved on a disk drive in a data storage system. Each storage processor of a data storage system maintains an ownership flag indicating whether the storage processor currently owns a set of one or more LUNs. The information in the ownership flag of each storage processor is maintained by upper-layer software (e.g., lower redirector 100, 108) of each storage processor. The upper-layer software of a storage processor includes flare driver for the storage processor. For example, in FIG. 7, flare driver 122 assigns a set of one or more LUNs to a storage processor based on the information stored in the ownership flag 124. Logical volume assignment logic 120 clears the ownership flag 124 on the first SP indicating that the LUN 111 can no longer be accessed from the first SP. Then, a trespass command (e.g. TRESSPASS_EXECUTE_IOCTL) is issued on the acquiring SP ("second SP") after the second SP acquires ownership of the LUN 111. Logical volume assignment logic 120 sets the ownership flag 124 on the acquiring SP to indicate that the LUN 111 can now be accessed from the second SP. Thus, the acquiring SP becomes the new owner of the LUN 111. Lower redirector 100 of the acquiring SP then informs flare driver 122 of the acquiring SP to assign the LUN 111 to the second SP when an assignment operation is triggered or an inquiry command is issued. In at least some implementations in accordance with the current technique, flare driver 122 assigns ownership of the LUN 111 to a storage processor based on the information stored in the ownership flag 124 instead of assigning the LUN 111 to a default owner.

Figure 8:
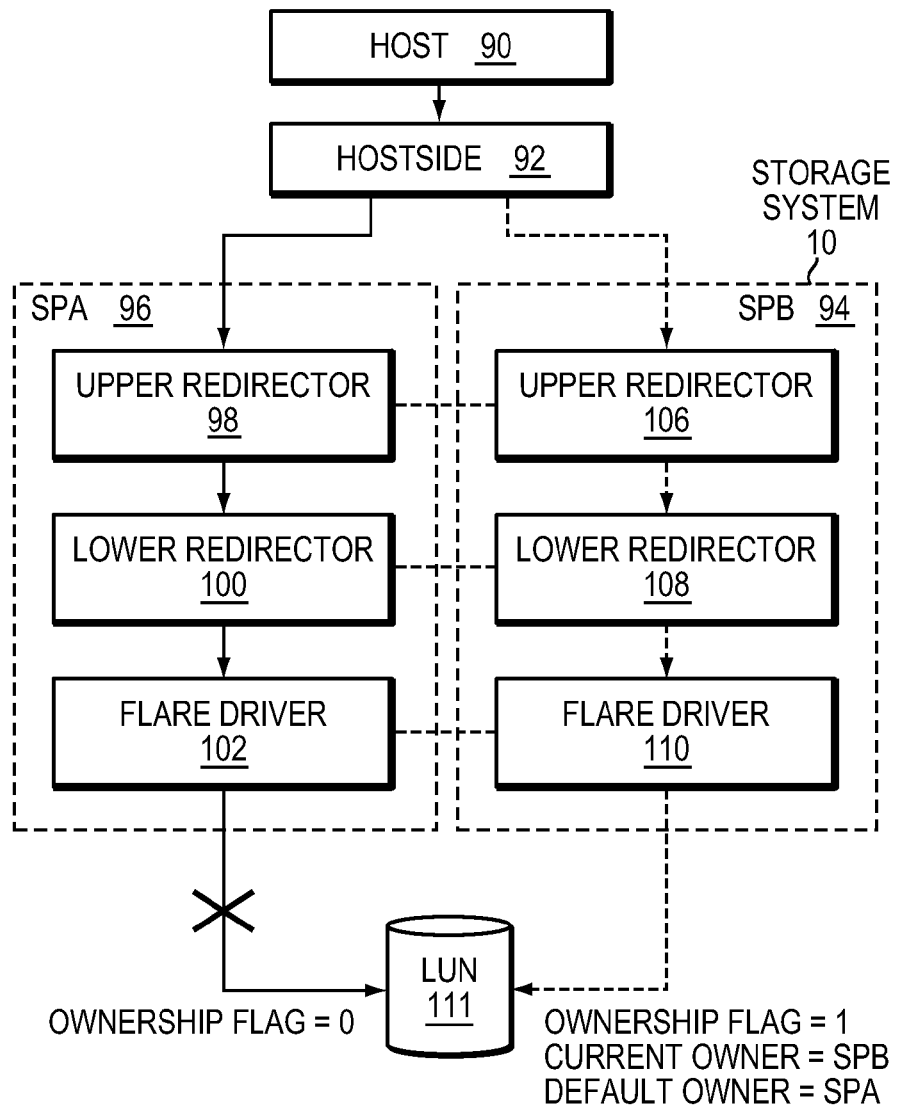

Referring to FIG. 8, shown is more detailed representation of components that may be included in an embodiment using the techniques herein. For example, in FIG. 8, when LUN 111 is created, host 90 assigns ownership of LUN 111 to SPA 96, in effect, making SPA 96 the default owner and the current owner of LUN 111. When SPA 96 looses access to LUN 111, flare driver 102 of the SPA 96 shuts down the LUN 111 on SPA 96 indicating that I/Os request sent to SPA 96 and directed to LUN 111 can no longer be serviced by SPA 96. Flare driver 102 informs lower redirector 100 that flare driver 102 can no longer access the LUN 111. Lower redirector 100 then finds an alternate path to access the LUN 111 and determines that SPB 94 can access the LUN 111. Lower redirector 100 then issues a trespass command to change the ownership of the LUN 111 from SPA 96 to SPB 94. As part of the trespass command, lower redirector 100 sends a notification to flare driver 102 indicating that lower redirector 100 has lost ownership of the LUN 111 and lower redirector 100 then clears the ownership flag on SPA 96 indicating that the LUN 111 is no longer owed by SPA 96. Lower redirector 100 then sends a notification to lower redirector 108 of SPB 94. Lower redirector 108 assumes ownership of the LUN 111 on SPB 94 by setting ownership flag on SPB 94 indicating that the LUN 111 is now owned by SPB 94, in effect, making SPB 94 the current owner of the LUN 111. If for some reason, the LUN 111 later breaks or fails due to a problem, a disk rebuild processing repairs and restores the LUN 111. When the LUN 111 is recovered, an assignment operation is triggered that causes flare driver 102, 110 to reassign the LUN 111 to a storage processor. Flare driver 102, 110 assigns the LUN 111 to a storage processor based on the information stored in an ownership flag of each storage processor. The ownership flag on SPA 96 indicates that SPA 96 does not own the LUN 111, thus LUN 111 is not assigned to SPA 96 even though SPA 96 is indicated as the default owner of the LUN 111. LUN 111 is assigned to SPB 94 based on the information stored in the ownership flag of SPB 94. The ownership flag of SPB 94 indicates that SPB 94 currently owns the LUN 111.

Figure 9:
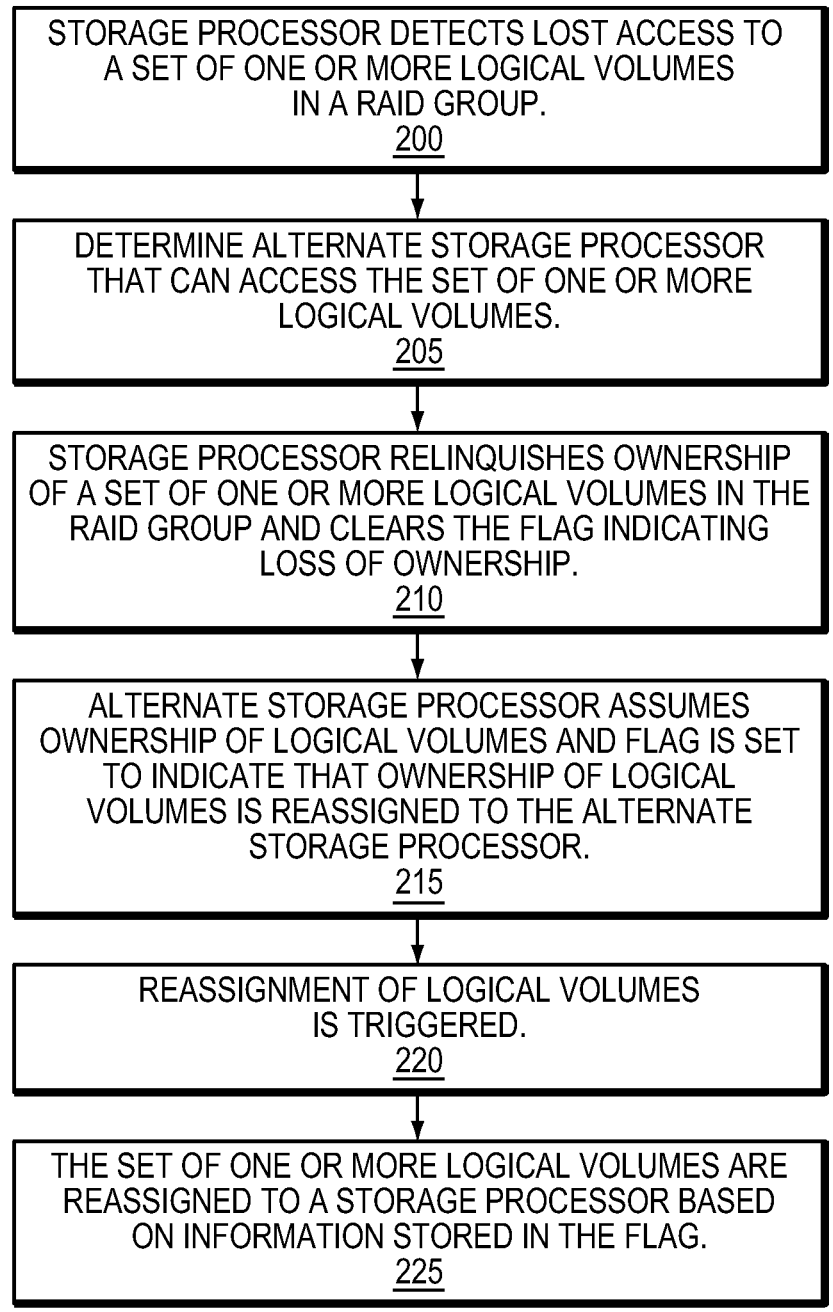
FIG. 9 is a flow diagram illustrating process that may be used in connection with techniques herein.

Referring to FIG. 9, shown is a flow diagram illustrating the method of managing ownership of logical volumes in a data storage system. With reference also to FIGS. 7 and 8, managing ownership of logical volumes starts with a storage processor in a data storage system 10 detecting lost access to a set of one or more logical volumes in a RAID group (step 200). The storage processor then proceeds to determine an alternate path in order to continue servicing user I/Os from a host system 90 by finding a better path to access the set of one or more logical volumes in the RAID group (step 205). Upon finding the better path, the storage processor relinquishes ownership of the set of one or more logical volumes in the RAID group. The storage processor also clears an ownership flag indicating that the storage processor has lost ownership of the set of one or more logical volumes in the RAID group (step 210). An alternate storage processor having the better path is assigned ownership of the set of one or more logical volumes and I/Os from the host system 90 are redirected to that storage processor. Additionally, the ownership flag in the alternate storage processor is set to indicate that the alternate storage processor is now the new owner of the set of one or more logical volumes (step 215). At a later time, reassignment of the set of logical volumes is triggered by any number of reasons (step 220). One of the reason that triggers the reassignment may include an assignment request. The set of one or more logical volumes are reassigned to a storage processor based on the information stored in the ownership flag of the alternate storage processor (step 225).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing ownership of logical volumes, the method comprising:
   determining a second path to a logical volume upon loosing access to a first path to the logical volume, wherein a first storage processor has the first path to the logical volume and a second storage processor has the second path to the logical volume, wherein upper-layer software selects the second path to the logical volume;
   based on the determination, changing ownership of the logical volume from the first storage processor to the second storage processor, wherein changing ownership includes updating ownership information associated with the first and second storage processors; and
   updating ownership of the logical volume upon receiving a request to reassign ownership of the logical volume, wherein lower-layer software updates ownership of the logical volume based on updated ownership information received from the upper-layer software.

2. The method of claim 1, wherein the information received from the upper-layer software includes a flag, the flag indicating owner of the logical volume.

3. The method of claim 1, wherein each storage processor of a set of storage processors has a respective path to the logical volume, wherein the path to the logical volume comprises lower-layer software and upper-layer software.

4. The method of claim 3, wherein each storage processor of the set of storage processors includes a respective flag indicating if each storage processor of the set of storage processors has responsibility for I/O communication with the logical volume.

5. The method of clam 4, wherein respective flag of each storage processor of the set of storage processors is stored in a persistent memory.

6. The method of claim 1, wherein determining the path to the logical volume further comprising:
   receiving respective information about communication with the logical volume from each storage processor of a set of storage processors, wherein each storage processor of the set of storage processors has a respective path to the logical volume; and
   based on the information received, determining the path to the logical volume.

7. The method of claim 1, wherein assigning ownership of the logical volume further comprising:
   transferring responsibility for I/O communication with the logical volume from a first storage processor to a second storage processor;
   clearing a flag of the first storage processor indicating transfer of responsibility for I/O communication; and
   setting a flag of the second storage processor indicating transfer of responsibility for I/O communication.

8. The method of claim 1, wherein assigning ownership of the logical volume is triggered by a request to assign ownership of the logical volume to a storage processor.

9. The method of claim 1, wherein the logical volume comprises a set of LUNs on disk drives in a RAID group.

10. The method of claim 1, wherein upper-layer software comprises a driver sending I/O communication to the logical volume, wherein lower-layer software comprises a driver executing I/O communications on the logical volume.

11. A system for use in managing ownership of logical volumes, the system comprising:
    first logic determining a second path to a logical volume upon loosing access to a first path to the logical volume, wherein a first storage processor has the first path to the logical volume and a second storage processor has the second path to the logical volume, wherein upper-layer software selects the second path to the logical volume;
    second logic changing, based on the determination, ownership of the logical volume from the first storage processor to the second storage processor, wherein changing ownership includes updating ownership information associated with the first and second storage processors; and
    third logic updating ownership of the logical volume upon receiving a request to reassign ownership of the logical volume, wherein lower-layer software updates ownership of the logical volume based on updated ownership information received from the upper-layer software.

12. The system of claim 11, wherein the information received from the upper-layer software includes a flag, the flag indicating owner of the logical volume.

13. The system of claim 11, wherein each storage processor of a set of storage processors has a respective path to the logical volume, wherein the path to the logical volume comprises lower-layer software and upper-layer software.

14. The system of claim 13, wherein each storage processor of the set of storage processors includes a respective flag indicating if each storage processor of the set of storage processors has responsibility for I/O communication with the logical volume.

15. The system of clam 14, wherein respective flag of each storage processor of the set of storage processors is stored in a persistent memory.

16. The system of claim 11, wherein determining the path to the logical volume further comprising:
    fourth logic receiving respective information about communication with the logical volume from each storage processor of a set of storage processors, wherein each storage processor of the set of storage processors has a respective path to the logical volume; and
    fifth logic determining, based on the information received, the path to the logical volume.

17. The system of claim 11, wherein assigning ownership of the logical volume further comprising:
- fourth logic transferring responsibility for I/O communication with the logical volume from a first storage processor to a second storage processor;
- fifth logic clearing a flag of the first storage processor indicating transfer of responsibility for I/O communication; and
- sixth logic setting a flag of the second storage processor indicating transfer of responsibility for I/O communication.

18. The system of claim 11, wherein assigning ownership of the logical volume is triggered by a request to assign ownership of the logical volume to a storage processor.

19. The system of claim 11, wherein the logical volume comprises a set of LUNs on disk drives in a RAID group.

20. The system of claim 11, wherein upper-layer software comprises a driver sending I/O communication to the logical volume, wherein lower-layer software comprises a driver executing I/O communications on the logical volume.

* * * * *